United States Patent
Ishmael, Jr. et al.

(10) Patent No.: US 6,907,461 B2
(45) Date of Patent: Jun. 14, 2005

(54) INTERACTIVE DATA PROCESSOR CONTROLLED DISPLAY INTERFACE FOR TRACKING ALLOCATED MESSAGES IN A DYNAMIC WORKLOAD BALANCING COMMUNICATION SYSTEM

(75) Inventors: Nizamudeen Ishmael, Jr., Austin, TX (US); Kulvir Singh Bhogal, Fort Worth, TX (US); Baljeet Singh Baweja, Austin, TX (US); Mandeep Sidhu, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 745 days.

(21) Appl. No.: 09/820,501

(22) Filed: Mar. 29, 2001

(65) Prior Publication Data

US 2002/0143947 A1 Oct. 3, 2002

(51) Int. Cl.[7] ............................................. G06F 15/173
(52) U.S. Cl. ...................... 709/226; 709/203; 709/224; 707/2; 703/21
(58) Field of Search ................................ 709/226, 224, 709/203; 707/2; 703/21

(56) References Cited

U.S. PATENT DOCUMENTS

| | | | | |
|---|---|---|---|---|
| 5,504,894 A | * | 4/1996 | Ferguson et al. | 707/2 |
| 5,799,173 A | * | 8/1998 | Gossler et al. | 703/21 |
| 5,884,298 A | * | 3/1999 | Smith et al. | 707/2 |
| 6,697,858 B1 | * | 2/2004 | Ezerzer et al. | 709/224 |
| 6,711,607 B1 | * | 3/2004 | Goyal | 709/203 |
| 6,728,770 B1 | * | 4/2004 | Bradford et al. | 709/226 |

\* cited by examiner

*Primary Examiner*—Jack B. Harvey
*Assistant Examiner*—Hai V. Nguyen
(74) *Attorney, Agent, or Firm*—Mark S. Walker; Suiter West Swantz PC LLO

(57) ABSTRACT

Tracking and displaying of allocated messages in dynamic workload balancing systems in message driven transaction environments which involve distributing data processing transactions into messages and dynamically allocating each of the messages to different computer systems for performance. A user is enabled to request the performance of a data processing transaction, dynamically transforming, via a server computer any requested transactions into messages free of user input and then allocating the messages to different computer systems. The system has user interactive displays for displaying the allocated messages and associated computer systems when required by the user so that the user may track the messages.

17 Claims, 8 Drawing Sheets

| SERVER QUEUE - PRIMARY - | | | | |
|---|---|---|---|---|
| ID | SUBJECT | SENDER | TIME SENT | DELEGATED | STATUS |
| 1. | ⊞ First Queue Item | Workload Balancing Server | 3:32PM-11/10/99 | Bob's Computer | Received |
| 2. | ⊞ Second Queue Item | Workload Balancing Server | 3:43PM-11/10/99 | Greg's Computer | Received |
| 3. | ⊞ Third Queue Item | Workload Balancing Server | 3:44PM-11/10/99 | Bob's Computer | Received |
| 4. | ⊞ Fourth Queue Item | Workload Balancing Server | 3:45PM-11/10/99 | Angela's Machine | Removed |
| 5. | ⊞ Fifth Queue Item | Workload Balancing Server | 3:47PM-11/10/99 | Greg's Laptop | Received |
| 6. | ⊞ Sixth Queue Item | Workload Balancing Server | 3:52PM-11/10/99 | Anthony's Box | Not Received |
| 7. | ⊞ Seventh Queue Item | Workload Balancing Server | 4:02PM-11/10/99 | Greg's Computer | Received |
| 8. | ⊞ Eighth Queue Item | Workload Balancing Server | 4:03PM-11/10/99 | Tom's Server | Queuing |

Clicking "Plus" by a specific queue item to view a detailed tracking

FIG. 3

| SERVER QUEUE - PRIMARY - | | | | |
|---|---|---|---|---|
| ID | SUBJECT | SENDER | TIME SENT | DELEGATED | STATUS |
| 1. | ⊞ First Queue Item | Workload Balancing Server | 3:32PM-11/10/99 | Bob's Computer | Received |
| 2. | ⊞ Second Queue Item | Workload Balancing Server | 3:43PM-11/10/99 | Greg's Computer | Received |
| 3. | ⊞ Third Queue Item | Workload Balancing Server | 3:44PM-11/10/99 | Bob's Computer | Received |
| 4. | ⊞ Fourth Queue Item | Workload Balancing Server | 3:45PM-11/10/99 | Angela's Machine | Removed |
| 5. | ⊞ Fifth Queue Item | Workload Balancing Server | 0/99 | Greg's Laptop | Received |
| 6. | ⊞ Sixth Queue Item | Workload Balancing Se[TRACK ALLOCATION]0/99 | | Anthony's Box | Not Received |
| 7. | ⊞ Seventh Queue Item | Workload Balancing Se 0/99 | | Greg's Computer | Received |
| 8. | ⊞ Eighth Queue Item | Workload Balancing Server | 4:03PM-11/10/99 | Tom's Server | Queuing |
| Clicking "Plus" by a specific queue item to view a detailed tracking | | | | |

FIG. 4

INTERACTIVE DATA PROCESSOR CONTROLLED DISPLAY INTERFACE FOR TRACKING ALLOCATED MESSAGES IN A DYNAMIC WORKLOAD BALANCING COMMUNICATION SYSTEM

TECHNICAL FIELD

The present invention relates to dynamic workload balancing and distribution in message driven transaction environments, and particularly to update a display interface used to track dynamically allocated messages.

BACKGROUND OF RELATED ART

Distributed data processing is a form of information processing in which workload is performed by separate computers linked through a communication network. One form of distributed data processing which is currently widely used is dynamic workload balancing in a message driven transaction environment. Such message driven environments are described in U.S. Pat. No. 5,799,173 and in the text, *Production Workflow, Concepts and Techniques*, Frank Leymann et al., published 2000, Prentice Hall, New Jersey. In a message driven transaction environment, communication between the user who initiates the transaction on a client computer and the computer systems to which portions of the transaction are dynamically distributed for performance or execution is based upon messages put into sequences of queues. A message may be considered to be a service request or a reply distributed and allocated via a server computer.

In a typical dynamic workload balancing system or process, a user on a client computer initiates a data transaction or sequence of transactions. The initiation data is sent to a server computer or a set of server computers that create the transactions. The server computer(s) are linked to other computer systems that may be individual computers or servers respectively connected to other sets of computers. A data transaction for purposes of the present description is defined as a discrete activity performed by a computer system. A transaction may be as simple as the entry of a customer order or the update of an inventory item. It may be as complex as a substantial portion of a computer program or routine. In message driven transaction environments the transactions are distributed or divided into messages which are allocated through queues and sequences of queues to linked computers or computer systems for message execution or performance.

The primary advantage of workload balancing systems is the ability to distribute and balance workload on computer systems operating on multiple platforms. The workload is allocated via message queues so that the balancing and allocation is transparent to the user and his input workload appears to be operating as if it were being done on an individual computer. All of the networking protocols in the distribution and message allocation needed to complete user input transaction requests are invisible to the user. An example of a workload balancing system can be found in International Business Machines Corporation MQSeries™ application programs. MQSeries for WindowsNT™, is described in the above Leymann et al. text at pp. 320–338 incorporated by reference herein.

Due to the transparent nature of the workload balancing operation, there are cases where messages are delayed or even lost in distribution and allocation. In current workload balancing systems, there is no user friendly process for tracking lost or delayed messages. In order to track a lost message a system administrator must go to each queue manager's queue on any computer system that could have possibly received a message from the workload balancing algorithm. Even then, if the administrator is trying to track an individual message's route, the task is made particularly difficult if the message has for some reason been removed from the message queue at any particular point.

In a complex workload distribution network with a hierarchy of several levels of computer systems with appropriate servers having queue manager's queues, and, in some cases, even intermediate Internet channels or connections, the difficulty of tracking becomes even more apparent.

SUMMARY OF THE PRESENT INVENTION

The present invention basically relates to a system, method and program for monitoring workload balancing in distributing data processing transactions into messages and dynamically allocating each of the messages to different computer systems for performance augmentation. This comprises enabling a user to request the performance of a data processing transaction and then, without any user input, dynamically transforming via a server computer any requested transactions into messages. These messages are then allocated to different computer systems. The system has user interactive display means for displaying the allocated messages and computer systems when required by the user so that he may track the messages.

More particularly, the invention involves systems in which some of the data processing transactions are each distributed or transformed into a plurality of data processing transactions which are then allocated as described above. The invention operates effectively in workload balancing systems in which there is a server queue for storing the plurality of messages from the distributed transaction, and in which each of the different computer systems has an associated queue for storing messages allocated to each respective participating computer system. If one of the different computer systems has means for reallocating to other computer systems, messages initially allocated to the one computer system, then the invention provides for user interactive means for displaying the reallocated messages and computer systems to which the messages are reallocated.

BRIEF DESCRIPTION OF THE DRAWINGS

The present invention will be better understood and its numerous objects and advantages will become more apparent to those skilled in the art by reference to the following drawings, in conjunction with the accompanying specification, in which:

FIG. 3 is a diagram of an interactive display screen listing message allocations of a queue manager's queue on a primary server presented to the user tracking messages in carrying out the present invention;

FIG. 4 is the display screen of FIG. 3 as the user is selecting a message for allocation tracking;

DETAILED DESCRIPTION OF THE PREFERRED EMBODIMENT

Figure 1:
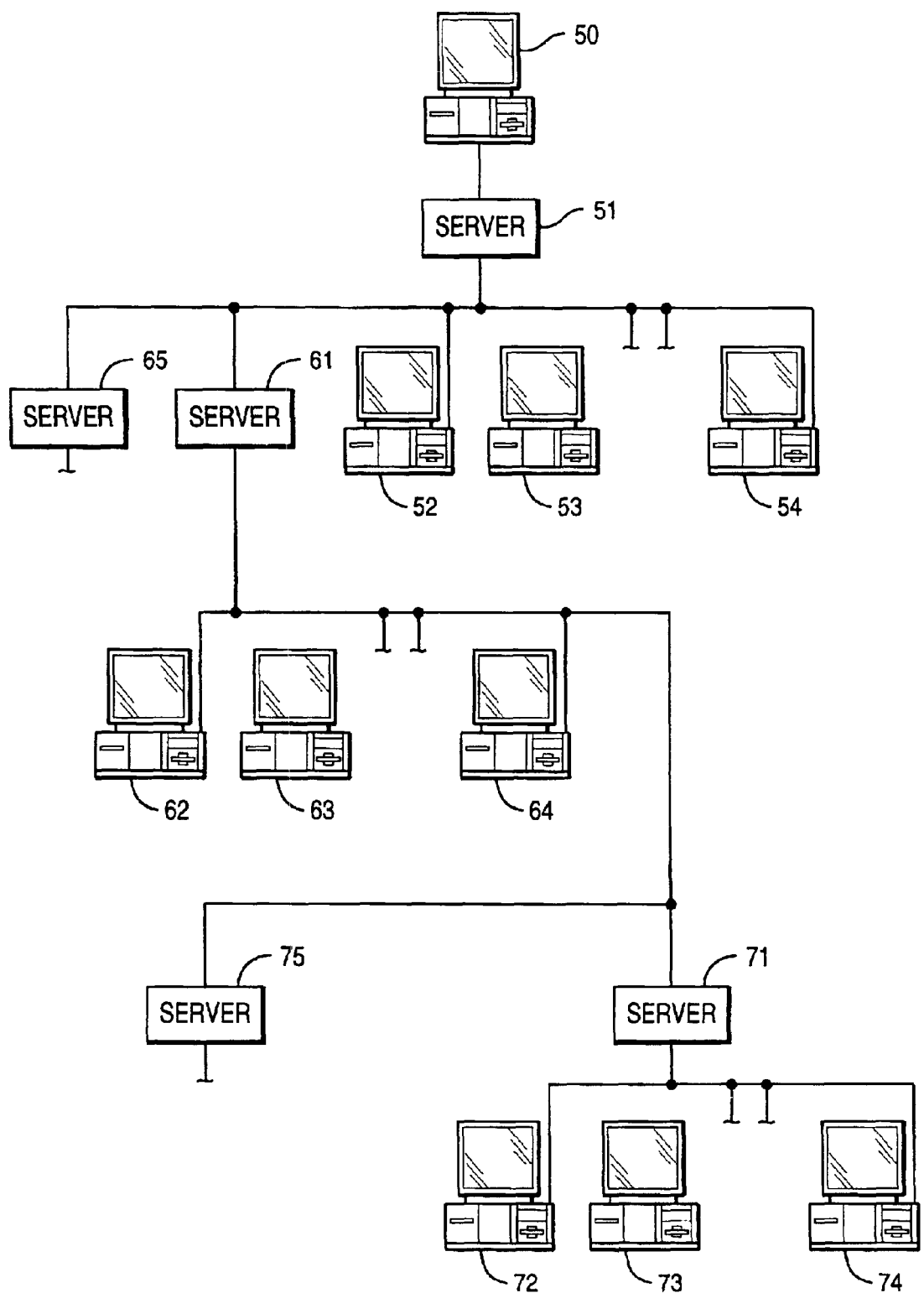
FIG. 1 is a diagram of a network setup on which the workload balancing and message tracking process of the present invention may be carried out.

FIG. 1 is a diagram of an exemplary network setup in which the workload balancing through message allocation including the message tracking process of the present invention may be carried out. By way of background, the present invention involves the tracking of messages in message driven transaction environments wherein the user at a client terminal inputs a data processing transaction which he needs to have performed, and the transaction is dynamically transformed or distributed into messages which in turn are communicated for performance to appropriate programs on appropriate computers in a network. In present message based transaction performance systems message allocation for performance or execution may be seamlessly communicated across computer systems with dozens of different supported platforms. A primary premise of message-based transactions in workload allocation is that the programs involved exchange requests and responses via queues. A program sends a request to a queue rather than a specific "partnered" program. Thus, a program can put a message into a queue even if there is no program currently available to retrieve the message from the queue and process it. Queue managers manage the queues and the messages contained or manipulated in the queues. This guarantees the ultimate delivery to and execution of the messages in appropriate target queues.

The primary services that message driven transaction environments require are provided by the message queue manager. Such services include administrative services to manage the queues and to manipulate the messages in the queues. Application programs that execute the messages reside in local or remote computer systems in the network. The application programs manipulate the messages through a messaging client that provides an interface to all necessary operations including cross-platform computer systems.

It should be understood in proceeding with the following description of the present invention that the particular algorithm used in workload balancing in distributing, parsing and allocating the data transactions into messages is in no way critical to the invention. Any workload balancing algorithm may be used. The present invention is directed to updating the display interface used to track of the allocated messages.

In the illustrative network of FIG. 1, a client user on computer display terminal 50 has input a transaction for performance. Terminal 50 is connected to server 51 which includes a workload balancing program and administrator that distributes the transactions into messages and allocates the messages to particular programs in computers in the system for execution. Server 51 also includes the message queue and the message queue manager. The messages may be dynamically distributed to display computer terminals 52, 53 or 54 for performance or execution, or to other computer systems controlled by servers 65 or 61 at a next hierarchical level, e.g. the system including server 61 and display computers 62, 63 and 64. Servers 65 and 61 will respectively include their own message queues and the message queue managers. Messages may be dynamically distributed to display computer terminals 62, 63 or 64 for performance or execution, or to other computer systems controlled by servers 75 or 71 at an even further hierarchical level, e.g. the system includes server 71 and display computers 72, 73 and 74. Here again, servers 75 and 71 will in turn respectively include their own message queue and the message queue manager. In complex distribution systems, the messages may even be allocated and communicated for execution through the World Wide Web (Web) or Internet. Since the allocation of messages is dynamic and transparent to the user, a message tracking system is described below.

Figure 2:
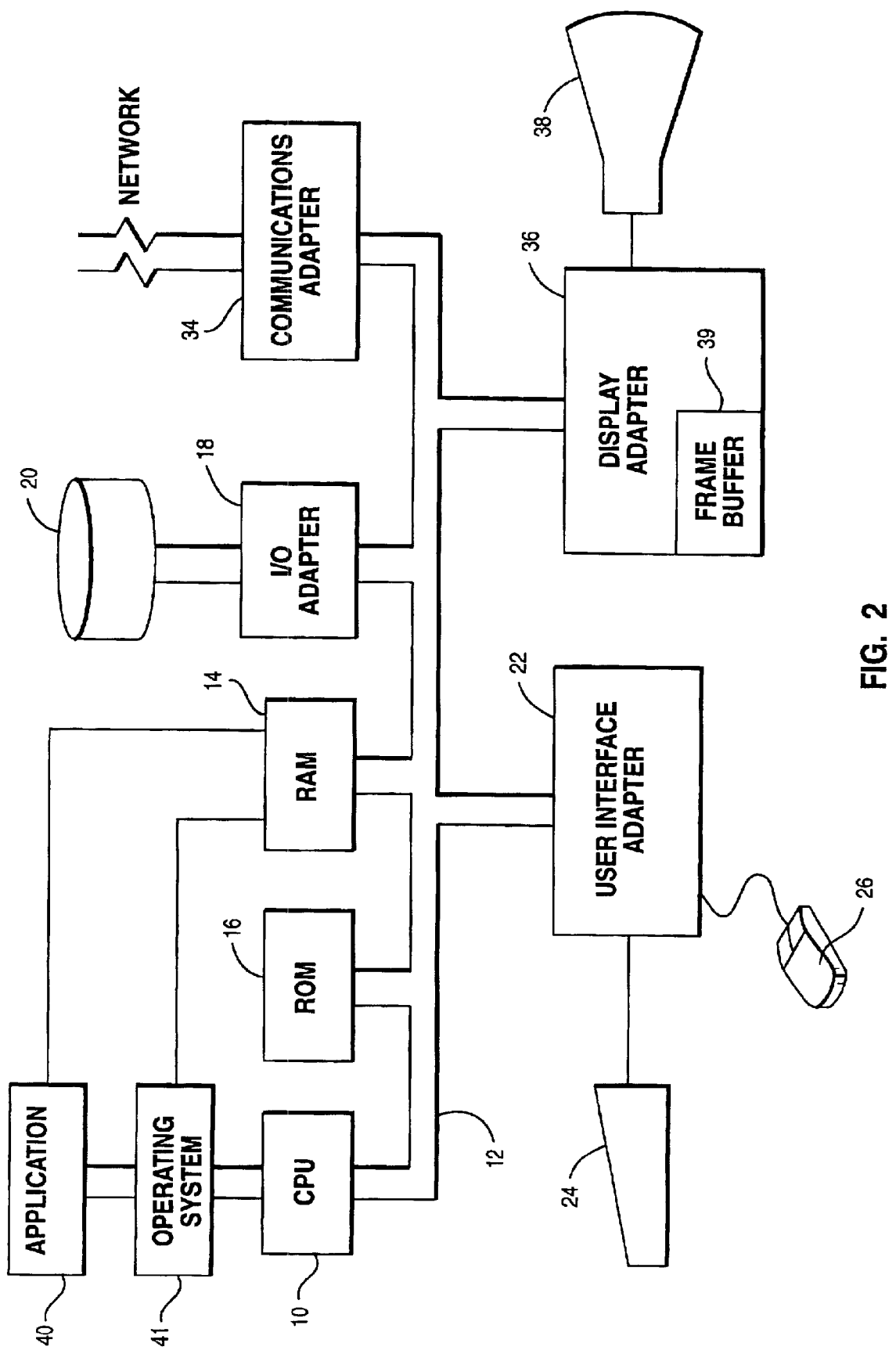
FIG. 2 is a block diagram of a data processing system including a central processing unit and network connections via a communications adapter which is capable of functioning as the display computers and servers of FIG. 1 in carrying out the present invention.

Referring to FIG. 2, a typical computer controlled display system is shown which may function as computer display terminals 52–54, 62–64 and 72–74 shown in FIG. 1. The display system of FIG. 2 may also be used for the workload balancing and queue management servers 51, 61, 65, 71 and 75. A commercially available PC microprocessor may be used as central processing unit (CPU) 10. If the system is used as a server, then CPU 10 may be a workstation such as RISC System/6000™ (RS/6000)™ series available from IBM. CPU 10 is interconnected to various other components by system bus 12. An operating system 41 runs on CPU 10, provides control and is used to coordinate the function of the various components of FIG. 2. Operating system 41 may be one of the commercially available operating systems such as AIX 6000™ operating system available from IBM; Microsoft's Windows 98™ or Windows NT™, as well as UNIX™ and AIX™ operating systems. Application programs 40, performing allocated message functions, move into and out of the main memory Random Access Memory (RAM) 14. On the server side, the application programs include appropriate workload balancing algorithms, queue management programs, as well as programs for tracking dynamically allocated messages. A Read Only Memory (ROM) 16 is connected to CPU 10 via bus 12 and includes the Basic Input/Output System (BIOS) that controls basic computer functions. RAM 14, I/O adapter 18 and communications adapter 34 are also interconnected to system bus 12. I/O adapter 18 may be a Small Computer System Interface (SCSI) adapter that communicates with the disk storage device 20. Communications adapter 34 interconnects bus 12 into the network environment of FIG. 1 to communicate with other such computers over a Local Area Network (LAN) or through the Web or Internet. The latter two terms are meant to be generally interchangeable and are so used in the present description. I/O devices are also connected to system bus 12 via user interface adapter 22 and display adapter 36. Keyboard 24 and mouse 26 are all interconnected to bus 12 through user interface adapter 22. Display adapter 36 includes a frame buffer 39, which is a storage device that holds a representation of each pixel on the display screen 38. Images may be stored in frame buffer 39 for display on monitor 38 through various components, such as a digital to analog converter (not shown) and the like. By using the aforementioned I/O devices, a user is capable of inputting information to the system through the keyboard 24 or mouse 26 and receiving output information from the system via display 38.

Figure 5:
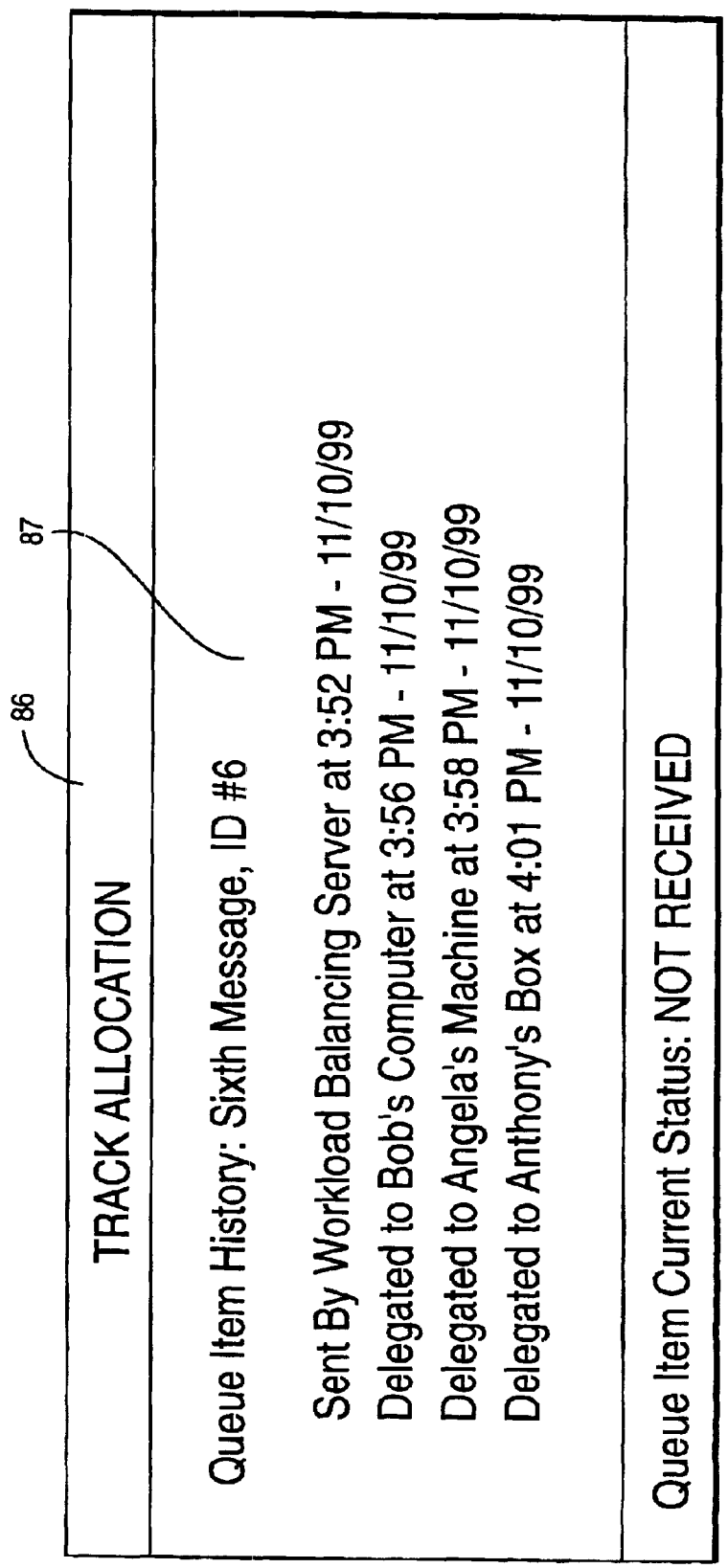
FIG. 5 is a display screen showing tracking history of a route of an item which a user selected from the display screen of FIG. 4.

FIGS. 3 through 5 depict an illustration of how a user who has requested a data transaction on an input display terminal, such as terminal 50 of FIG. 1, may track the allocation and status of the messages for carrying out the transaction(s). The user may display the message queue listing 80, FIG. 3, of the message queue in server 51, on computer display terminal 50. The displayed listing shows the message ID 82, the sender 81, the status 83 of each listed message and the present stage of dynamic allocation of the message 89.

As shown in FIG. 4, the allocation status 89 of the message in the 6th queue is uncertain. When the user selects item 86 they are provided with an interactive button 85 that when activated brings up the display of FIG. 5. The display in FIG. 5 shows the allocation history 86 of the sixth queue item as it was dynamically allocated and reallocated via listed route 87 through a network such as that shown in FIG. 1. The route 87 indicates that the sixth message was received at "Angela's Machine" where it was allocated to "Anthony's Box" where it has not been received as yet. Thus, the message is currently being worked on at Anthony's Box. It should be noted that the accessibility of the managed messages queue as in FIG. 3 enables the interactive user to delete or modify messages listed in the queue.

Figure 6:
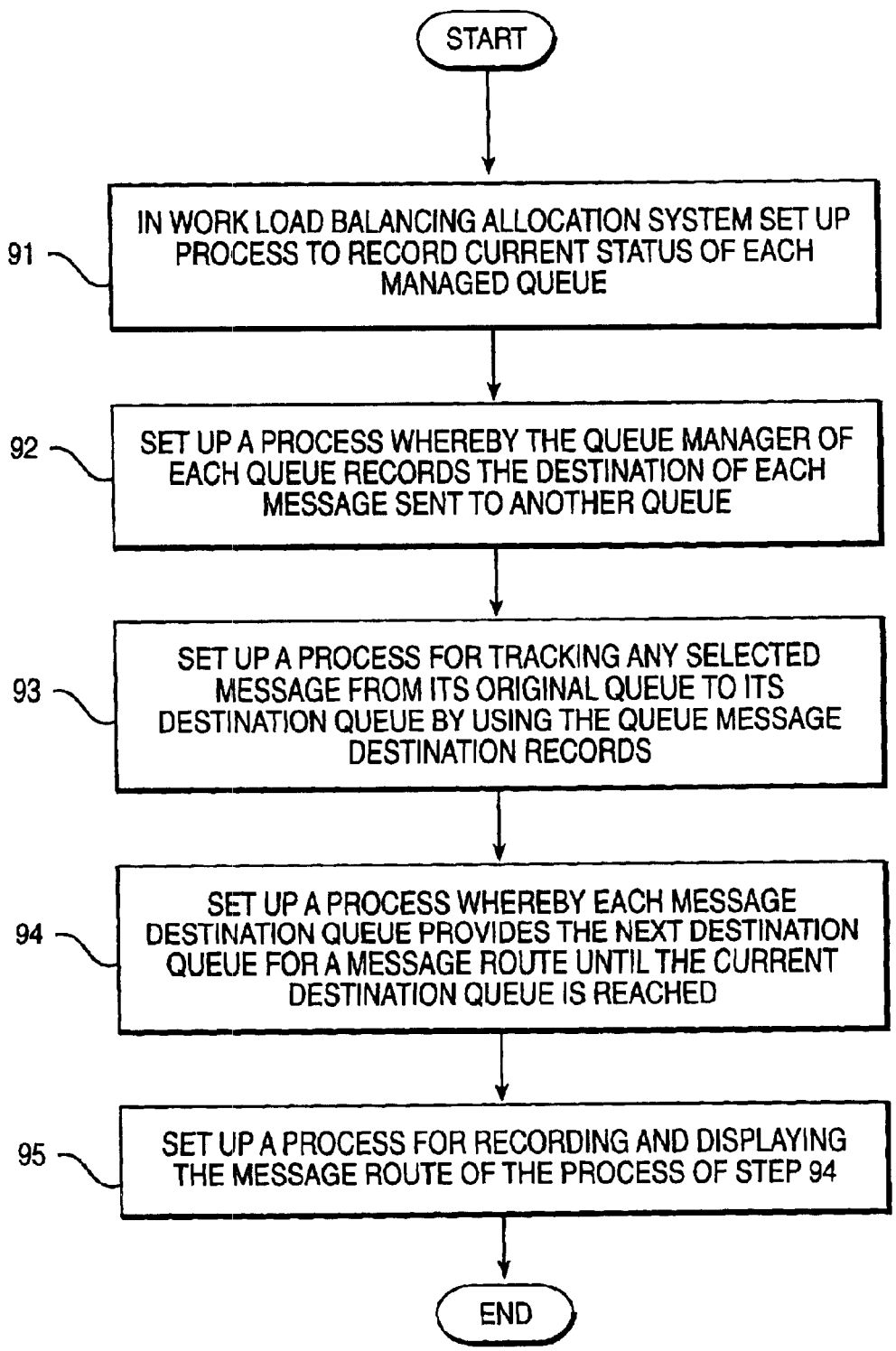
FIG. 6 is a flowchart of an example of a typical programming process for use in a workload balancing system to implement the tracking of the present invention.

FIG. 6 is an example of how the workload balancing processes of the present invention may be set up. In any workload balancing system, means are set up in association with each managed queue in its respective server for recording the destination of each message sent to another queue, step 91. A process is set up so that the queue manager of each managed queue records the destination of each message sent to another queue, step 92. A process is set up, step 93, for tracking any selected message from its original queue to its destination queue by using the queue message destination records from step 92. A process is set up, step 94, whereby each message destination queue provides the next destination for determining the route of a message until the most current destination queue is reached. A process is provided, step 95, for recording and displaying the message route determined by the process of step 94.

Figure 7:
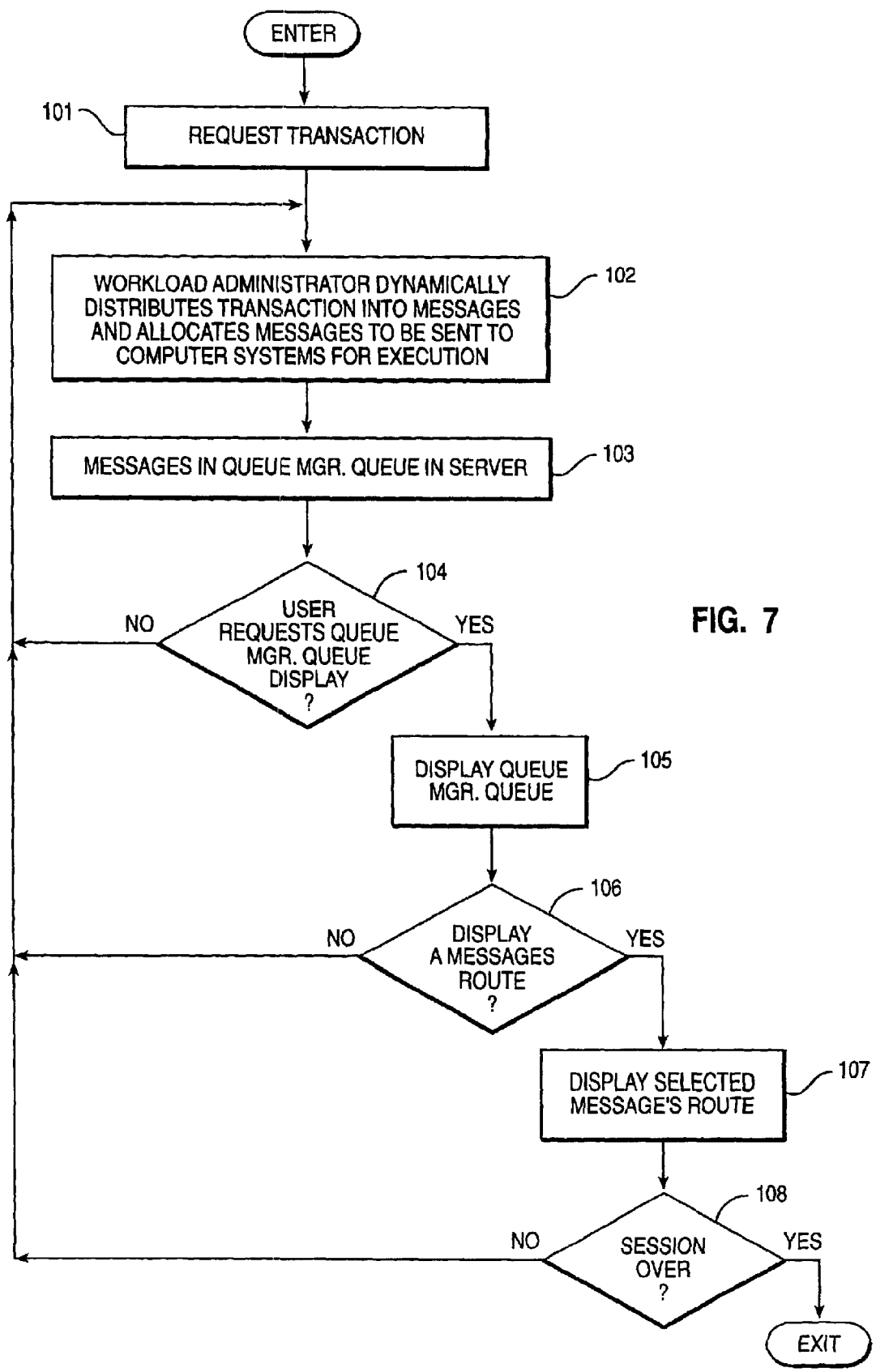
FIG. 7 is a flowchart of an illustrative run of a process set up according to FIG. 6 for message tracking.

Now, with reference to FIG. 7, we will describe how a transaction may be processed and tracked using the processes set up in FIG. 6. The user requests an initial transaction, step 101, on an input terminal, e.g. display terminal 50, FIG. 1. The workload balancing program administrator in the server dynamically distributes and/or parses the input transaction into messages and allocates messages to be sent to particular computers and computer systems for execution, step 102. The messages are put into the queue manager's queue in the server, e.g. server 51, FIG. 1, step 103. At any point in this procedure the user may request, decision step 104, a display of the queue manager's message queue. If No, the user does not make such a request, the process returns to step 102 and the allocation continues. However, if the decision from step 104 is Yes, the user has requested the display of the queue, then the queue, as shown in FIG. 3, is displayed, step 105. At this point, the user may note something in the displayed queue which may lead him to decide that he needs to view the allocation route of the message. If No, decision step 106, the process is returned to step 102, and the allocation process is continued. If the decision from step 106 is Yes, then step 107, the selected messages route is displayed. At this point, a determination may be made as to whether the session is over, decision step 108. If Yes, the session is exited. If No, then the session is again returned to step 102 and the message allocation process is continued.

Figure 8:
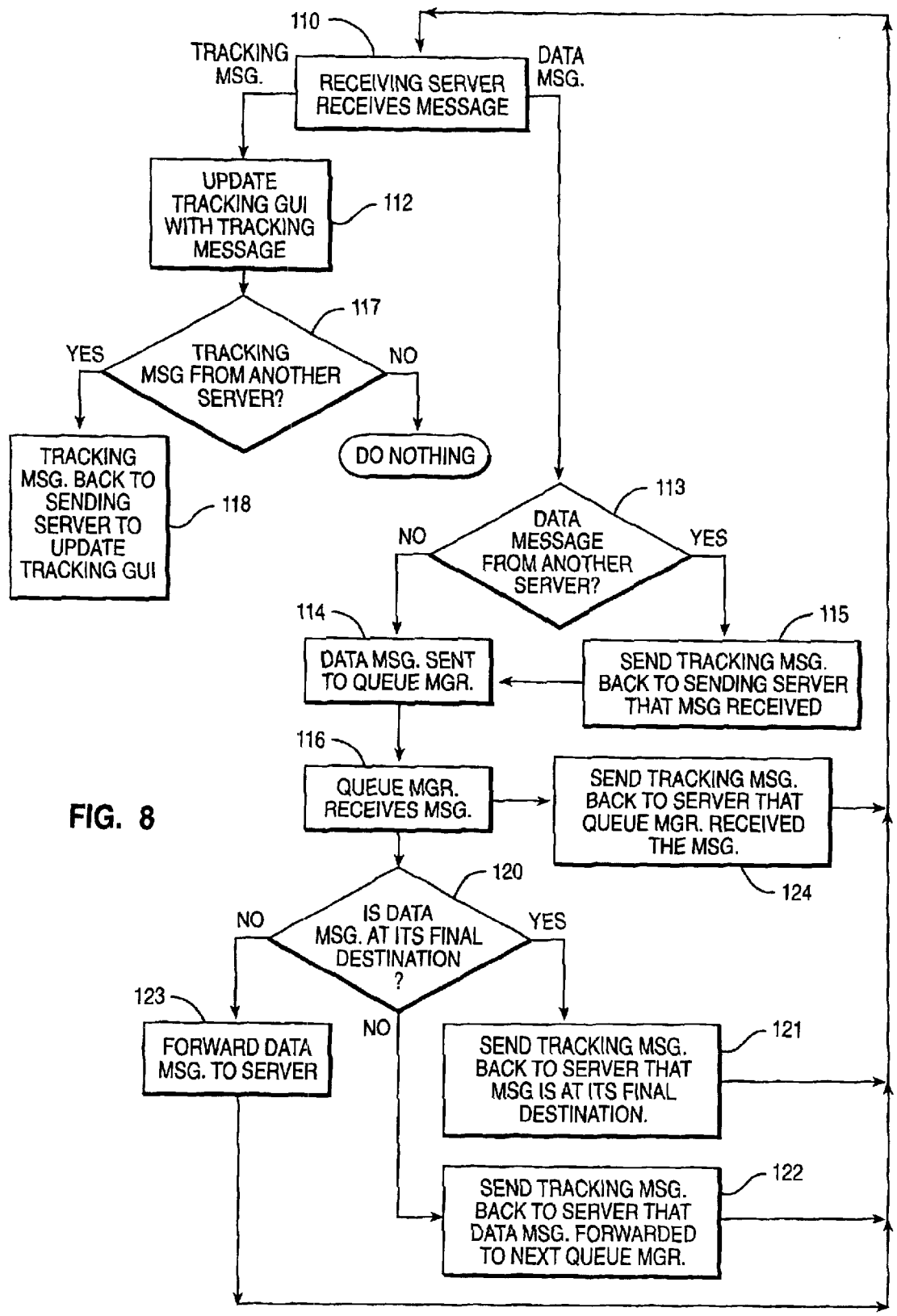
FIG. 8 is a flowchart setting forth an example of how the route of a tracked allocated message may be recorded so that i's status is available to previous servers in its allocation route.

FIG. 8 is a flow diagram depicting an example of how the tracking and display interface is updated at a receiving server. The receiving server referred to herein receives messages and may have a display similar to that described above. The route of an allocated message may be recorded (step 95 of FIG. 6) so that its status is available to previous servers in its allocation route and that route may be displayed (step 107 of FIG. 7). For purposes of describing FIG. 8, the allocation tracking display of FIG. 5 is referred to as the tracking Graphic User Interface (GUI). A workload transaction is distributed into a plurality of messages for performing the actual work. These messages are referred to herein as "data messages." A plurality of "tracking messages" are generated to track the status of the data messages and update the tracking GUIs associated with the sequence of servers in the allocation route of the data messages. For example, a sending server sends a transaction as a sequence of messages to a receiving server. Upon receipt the receiving server determines whether the message is a data message or a tracking message, step 110.

Where the message is a tracking message, the process flow proceeds through step 110 to step 112 where the tracking GUI associated with the sending server of the data message is updated to reflect the tracking message. A determination is made in step 117 as to whether the tracking message came from another server. If the tracking message is from another server, in order to update the tracking GUI, another tracking message is sent to the sending server of the first tracking message until the original sending server or the server that runs the GUI receives the message, step 118.

If the message received in step 110 is a data message, then the server determines whether the data message was sent from another server, step 113. If the data message is not from another server, the data message is sent to the queue manager and no tracking message is sent, step 114. The data message may be sent to the queue manager that contains the destination queue or to the queue manager that will forward the message to the destination queue. Where the decision in step 113 is Yes, the process sends a tracking message to the sending server, step 114. The process proceeds to step 115, where the data message is sent to a queue manager. When the intended queue manager receives the data message, step 116, the server is advised through a tracking message that the next queue manager has received the message step 124, and a determination is made, step 120, as to whether the data message is at its final destination. If Yes, then a tracking message is sent back to the receiving server depicted in step 110, that the queue manager has received the message, step 121. If the decision in step 120 is No, the data message is not at its final destination, two things happen simultaneously, 1) a tracking message is sent back to the server in step 110 that the data message is forwarded to another queue manager, step 122; and 2) the data message is then forwarded to the server for further processing, step 123.

One example of an implementation of the present invention is in an application program 40 consisting of programming steps or instructions resident in RAM 14, shown in FIG. 2, of the server computers during various operations. Until required by the computer system, the program instructions may be stored in another readable medium (e.g. in disk drive 20, or in a removable memory such as an optical disk for use in a CD ROM computer input, or in a floppy disk for use in a floppy disk drive computer input). Further, the program instructions may be stored in the memory of another computer prior to use in the system of the present invention and transmitted over a LAN or a Wide Area Network (WAN), such as the Internet, as required by the user of the present invention. One skilled in the art should appreciate that the processes controlling the present invention are capable of being distributed in the form of computer readable media of a variety of forms.

Although certain preferred embodiments have been shown and described, it will be understood that many changes and modifications may be made therein without departing from the scope and intent of the appended claims.

What is claimed is:

1. A system for updating a display interface associated with a workload balancing system for distributing data processing transactions into a plurality of messages and for dynamically allocating each of the messages to different computer systems for performance comprising:

means for requesting the performance of a data processing transaction;

server computer for distributing the transaction into a plurality of messages and allocating the messages to different computer systems;

display interface for displaying the allocated messages and associated computer systems, wherein the display interface is operatively associated with the server computer; and means for communicating allocation history for each allocated message to the display interface.

2. The system of claim 1 further including a server queue for storing the plurality of messages from the distributed transaction.

3. The system of claim 2 wherein each of the different computer systems has an associated queue for storing messages allocated to each respective computer system.

4. The system of claim 3 wherein at least one of the different computer systems has means for reallocating to other computer systems, messages initially allocated to the one computer system.

5. The system of claim 4 further comprising a means for sending a tracking message to the display interface each time a message is reallocated.

6. A method for updating a display interface used to track data processing transactions distributed into a plurality of messages that are dynamically allocated to different computer systems for performance comprising:

in response to a request for the performance of a data processing transaction, distributing, from a server computer, the transaction into a plurality of messages and allocating the messages to different computer systems;

displaying allocated messages and associated computer systems at a display interface, wherein the display interface is operatively associated with the server computer; and communicating allocation history for each allocated message to the display interface.

7. The method of claim 6 further comprising storing the plurality of messages from the distributed transaction in a server queue.

8. The method of claim 7 further comprising storing messages allocated to each respective computer system in a queue associated with the computer system.

9. The method of claim 8 further comprising reallocating to other computer systems, messages initially allocated to one of the different computer systems.

10. The method of claim 9 further comprising displaying the reallocated messages and computer systems to which the messages are reallocated.

11. The method of claim 10 further comprising sending a tracking message to the display interface each time a message is reallocated.

12. A computer program product on a computer readable medium for use in a data processing system for administering exam content from a server to a number of clients over a network, comprising:

instructions for requesting the performance of a data processing transaction;

instructions for distributing, at a server computer, the transaction into a plurality of messages and allocating the messages to different computer systems;

instructions for displaying, at a display interface, the allocated messages and associated computer systems; and instructions for communicating allocation history for each allocated message to the display interface.

13. The product of claim 12 further comprising instructions for storing the plurality of messages from the distributed transaction in a queue.

14. The product of claim 13 further comprising instructions for storing messages allocated to each respective computer system in a queue associated with the computer system.

15. The product of claim 14 further comprising instructions for reallocating to other computer systems, messages initially allocated to one of the different computer systems.

16. The product of claim 15 further comprising instructions for displaying the reallocated messages and computer systems to which the messages are reallocated.

17. The product of claim 12 further comprising instructions for sending a tracking message to the display interface each time a message is reallocated.

* * * * *